United States Patent Office 3,286,054
Patented Nov. 15, 1966

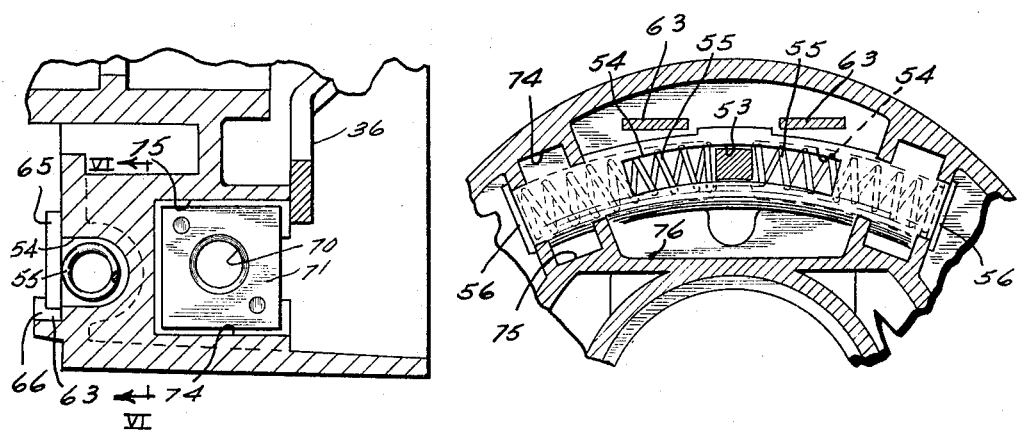
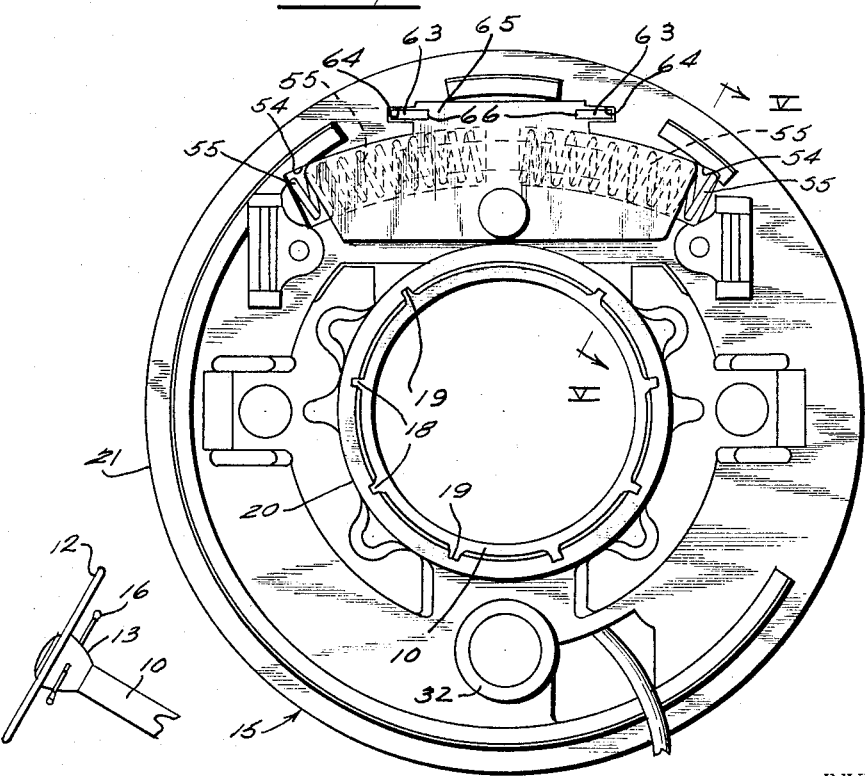

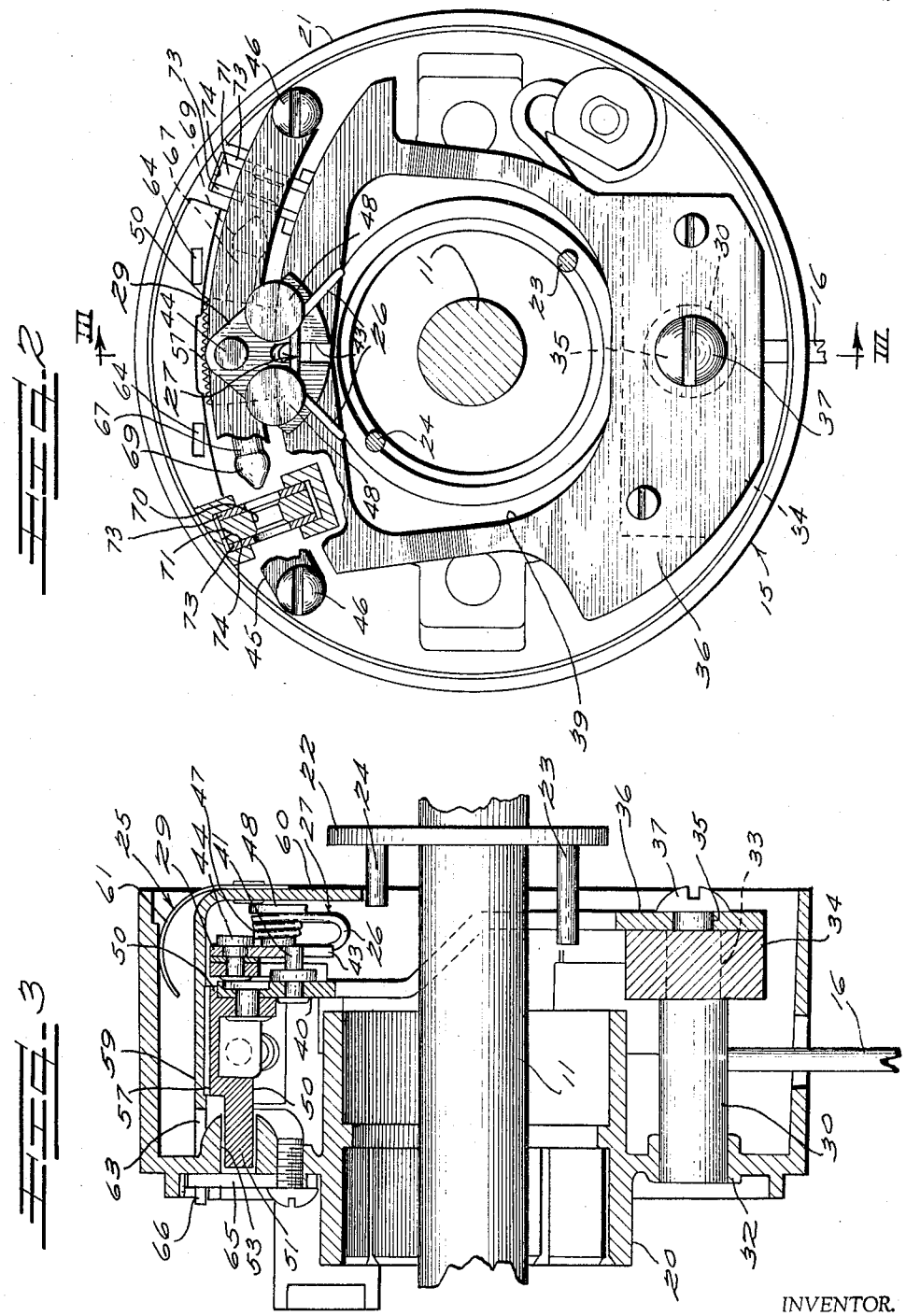

3,286,054
DIRECTIONAL TURN INDICATOR SIGNAL HAVING DELAYED RELEASABLE MEANS CANCELLING SIGNAL AS VEHICLE IS TURNED TO A STRAIGHT AHEAD DIRECTION
Richard H. Jordan, Fort Myers, Fla., and Samuel A. Findley, Bronson, Mich., assignors to Kingston Products Corporation, Kokomo, Ind., a corporation of Indiana
Filed June 15, 1964, Ser. No. 374,995
13 Claims. (Cl. 200—61.34)

This invention relates to improvements in directional turn indicators for signaling the intention of turning of an automotive vehicle.

Heretofore, the directional turn indicators on automotive vehicles only discontinue the turn signal upon the turning of a relatively sharp turn which may be close to a right angled turn. As a result, when the turn indicator is used to signal a change in lanes or passing an automotive vehicle, the turn signal light continues to blink after the automotive vehicle has changed its lane or passed a vehicle and is traveling in a straight ahead direction. The signal light may then blink for long periods of time and the operator of the vehicle will not be aware of this blinking with the result that this blinking will confuse other drivers on the road.

A principal object of the present invention is to remedy the foregoing deficiencies in directional turn indicators for automotive vehicles by providing a release for the turn indicator which will be released and turn off its signal in a predetermined time delay interval when the degree of turn is not great enough to cancel the signal as the steering wheel is turned toward its straight ahead position.

Another object of the present invention is to improve upon the turn indicators heretofore in use by providing a turn indicator in which the turn signal will shut off after the steering wheel has been turned to steer the vehicle in a straight ahead direction and the vehicle has traveled in a straight ahead direction for a sufficient period of time to enable the operator of the vehicle to completely pass another vehicle or change lanes and travel along the changed lane.

Still another object of the invention is to provide a novel and improved directional turn indicator in which the turn signal is discontinued upon the completion of a normal turn and in which the signal is also discontinued when the turn is not sharp enough to normally discontinue the signal after the vehicle has traveled in a straight ahead direction, for a predetermined time interval.

Still another object of the invention is to provide a simple and improved form of directional turn indicator having a novel form of time delay means holding the turn signal on until positively tripped, together with a release means for the time delay means releasable when the vehicle is traveling in a straight ahead direction to discontinue the turn signal after the vehicle has traveled for a selected time in a straight away direction, regardless of the sharpness of the turn made.

A still further object of the invention is to provide a release for turn indicators, turning off the indicator signal and returning the turn lever to a neutral position upon the making of a turn not sharp enough to normally discontinue the signal, in which the release consists of a novel form of washer and plunger arrangement holding the turn indicator in a signaling position together with a brake cooperating with the washer and plunger and releasable to accommodate the release of the plunger from the washer in a predetermined time delay interval and to thereby discontinue the turn signal.

These and other objects of the invention will appear from time to time as the following specification proceeds and with reference to the accompanying drawings wherein:

FIGURE 1 is a diagrammatic view of a steering column and wheel of an automotive vehicle of a type having a turn indicator constructed in accordance with the principles of the present invention incorporated therein;

FIGURE 2 is a plan view of the turn indicator with certain parts broken away and certain other parts shown in section;

FIGURE 3 is a sectional view of the turn indicator taken substantially along line III—III of FIGURE 2;

FIGURE 4 is a bottom plan view of the turn indicator shown in FIGURES 2 and 3 with certain parts removed;

FIGURE 5 is a fragmentary sectional view taken substantially along line V—V of FIGURE 4 with the figure turned at right angles to its normal position; and FIGURE 6 is a fragmentary sectional view taken substantially along line VI—VI of FIGURE 5.

In the embodiment of the invention illustrated in the drawings, we have diagrammatically shown in FIGURE 1 a steering column 10 encasing a steering post 11 having a steering wheel 12 at the upper end thereof. The steering column 10 has an enlarged upper housing portion 13, just beneath the steering wheel and carrying the horn button (not shown) and a turn indicator 15 having an indicator lever 16 extending generally radially of said housing portion and normally in a neutral position, but movable to the right or left of neutral to effect the lighting of a signal lamp (not shown) to indicate the intention of the operator of the vehicle to make a right or left hand turn.

The steering column 10 is shown in FIGURE 4 as having ribs 18 extending radially outwardly of the periphery thereof and longitudinally thereof and engaging grooves 19 recessed within a collar or sleeve portion 20 of a casing 21 for the turn indicator, suitably enclosed by the housing 13. The steering post 11 extends through the steering column and casing 21 and has the steering wheel 12 suitably mounted on its upper end. The steering post also has a disk 22 thereon having diametrically opposed pins 23 and 24 extending inwardly therefrom within the casing 21. The pin 24 is shorter than the pin 23 and is adapted to release a brake 25 when the steering wheel and post are moved into a position to steer the car in a straight ahead direction, to release the turn indicator and turn the turn signal off and return the indicator lever 16 to a neutral position after a predetermined time interval where the degree of turn is not great enough to turn the indicator to its neutral position as the steering wheel moves to a straight ahead position, as will hereinafter more clearly appear as this specification proceeds.

The longer pin 23 is adapted to engage one or the other of two spaced actuator ends 26, 26 of a spring actuator 27, moving a release cam or lever 29 to move the indicator lever to a neutral position and discontinue the turn signal upon the completion of a turn either to the right or the left.

The indicator lever 16 extends radially of a pin or shaft 30 having a lower end portion pivotally mounted in a boss 32 formed integrally with the casing 21. The shaft 30 also has a reduced diameter upper end portion 33 pivotally mounted in a switch casing 34 spaced vertically of the boss 32. The shaft 30 is so formed as to close a switch (not shown) within the switch casing upon the positioning of the lever 16 in either of its turn indicating positions. The upper end portion 33 of the shaft 30 extends above the switch casing 34 and has opposite flattened sides 35 forming a mounting for a cam plate 36, and turning said cam plate in one direction or another to effect the lighting of a signal light (not shown) and indicate an intention to make a right or left hand turn. A machine screw 37 is shown as securing the cam plate 36 to the flattened upper end portion of the shaft 30.

The camplate 36 is shown in FIGURES 2 and 3 as extending across the casing 21 and as having an open central portion 39 extending about the steering post 11 and sufficiently wide to accommodate the turning of said cam plate to the right or left of a neutral position upon turning movement of the indicator lever 16, without interfering with the steering post 11 or the release pin 23 on the disk 22. The cam plate 36 has a downwardly or inwardly stepped outer end portion 40 extending beneath the release cam 29 and having a flanged pin 41 riveted or otherwise secured thereto and extending upwardly therefrom within a radial slot 43 in the release cam 29, to effect turning movement of the cam plate 36 and indicator lever 16 to a neutral position, upon tripping of the cam 29 by engagement of the pin 23 with either one of the actuator ends 26 of the cam actuator 27 as will hereinafter more clearly appear as this specification proceeds.

The release cam 29 in turn is pivoted adjacent its outer end portion on a pivot pin 44 riveted or otherwise secured to a stationary fulcrum support 45 and extending upwardly of said support. The fulcrum support 45 is shown as being in the form of an arcuate bar secured at its ends to the casing 21 as by machine screws 46, 46.

The actuator spring 27 is shown in FIGURES 2 and 3 as having two looped portions 47 extending about spaced headed pins 48, riveted or otherwise secured to the release cam 29 on opposite sides of the slot 43 and extending upwardly therefrom. The actuator ends 26 of the actuator spring 27 extend angularly outwardly of the pins 48 in opposite directions. The inner sides of said actuator ends 26 when engaged by the pin 23 thus pivot the release cam 29 in one direction or another to positively pivot the cam plate 36 toward a neutral position. The outer sides of the actuator ends 26 when engaged by the pin 23 in either direction of movement of said pin accommodate the pin to pass thereby with no actuating affect of the release cam 29.

The cam plate 36 has a bracket 50 riveted or otherwise secured to its outer end portion and extending downwardly therefrom to the lower end portion of the housing 21. The bracket 50 is generally arcuate in plan view, the arcuate faces of which are struck from the center of the shaft 30 and center of turning movement of the cam plate 36, and has a tongue 51 slidably guided in a slot or channel 53 formed in the bottom of the casing 21 and extending upwardly of the bottom of said casing. The slot or channel 53 has communication at its opposite ends with two aligned spring channels 54 having compression springs 55 extending therealong and seated at their outer ends in end caps 56 for said spring channels. The compression springs 55 thus bias the tongue 53 and cam plate 36 into the neutral position shown in FIGURE 2.

The bracket 50 also has a serrated outer end portion 57 extending along the rear or outer face of said bracket, intermediate the ends thereof. The serrated face 57 is engaged with an inner serrated face of a brake plate 59 of the brake 25. The brake plate 59 has a right angled upper end portion 60 extending over the release cam 29 and actuator ends 26 of the actuator spring 27 in position to be engaged by either one of the pins 23 or 24, to effect release of the brake 25 when the vehicle is traveling in a straight ahead direction and upon the completion of a turn, to accommodate the actuator cam 29 or the springs 55 to return the actuator plate 36 into the neutral position shown in FIGURE 2. The right angled upper end portion 60 of the brake plate 59 has a leaf spring 61 riveted or otherwise secured thereto and extending rearwardly therefrom. The leaf spring 61 is of a generally arcuate form and is spaced rearwardly of the brake plate 59 and turns inwardly toward said brake plate and engages the inner wall of the casing 21 to bias the serrated portion of said brake plate into engagement with the serrations 57 extending along the rear face of the bracket 50.

The brake plate 59 has spaced legs 63 extending downwardly therefrom through slots 64 formed in a bottom 65 of the casing 21. The legs 63 have inwardly turned gibbed portions 66 extending over the bottom 65 to retain the brake plate 59 to the casing 21 and to accommodate pivotal movement of said brake plate away from the bracket member 50 to disengage the brake, and movement of said brake plate toward the bracket member 50 under the bias of the leaf spring 61 to engage the brake.

While the braking surfaces on the bracket 50 and brake plate 59 are shown as being serrated surfaces, they need not be serrated but may be formed from a suitable friction material if desired.

Referring now in particular to the means for cancelling out a turn signal when the turn signal is used to indicate the changing of a lane or passing and the vehicle is not turned for enough to engage the actuating ends 26 of the actuator spring 27 to positively turn the release cam 29 to move the cam plate 36 and turn indicator 16 into its neutral position, the bracket 50 has plungers 67 extending therefrom in opposite directions and intermediate the ends of said bracket. The plungers 67 have enlarged heads 69 converging toward their outer ends and fitting through time delay apertures 70 formed in time delay washers 71. The plungers 67 extend in the general arc of travel of the cam plate 36 and the centers of the time delay apertures also extend along a circumferential line, the axis of which is struck about the axis of pivotal movement of the cam plate 36. As shown in FIGURE 2, the time delay washers 71 have backup washers 73 on opposite sides thereof having apertured portions of a substantially larger diameter than the apertured portions of the time delay washers. The backup washers and time delay washers are mounted at their opposite sides in retaining recesses 74 and 75 formed integrally with the casing 21. As shown in FIGURES 2 and 6, one retaining recess 74 extends inwardly of the circumferential wall portion of the casing 21 while the opposite aligned retaining recess 75 is formed integrally with an inner wall portion 76 of the casing 21 and in alignment with the retaining recess 74.

The time delay washers 71 may be made from a suitable plastic material and the apertured portions 70 thereof are beveled on each end thereof to accommodate the heads 69 of the plungers 67 to pass therethrough and to hold the cam plate 36 and indicator lever 16 in either a right or left hand turn position in cooperation with the brake 25, but to accommodate either compression spring 55 to withdraw the head 69 from its associated aperture 70 in a predetermined time delay interval after the steering wheel has been turned to a straight ahead position.

The quantitative value of the time delay depends in part on the type of material selected for use in the washer or sleeve 71. One material known to the trade as Texin 192–A was incorporated in the structure described and gave a time delay of approximately two minutes. Texin 192–A has a very low coefficient of friction and the time delay is caused by a gradual fatiguing of the material, to gradually let the aperture 70 expand until the plunger 67 will slip through. During the operation of the turn signal the thickest part of the head 69 goes all the way through the aperture 70 of the time delay washer 71. An associated compression spring 55 gradually pushes the head 69 back through the aperture 70, gradually opening the aperture. Once the thickest part of the head has been completely pushed back into the aperture 70 by the associated spring 55, it slips through the aperture rather fast. With Texin 102–A, therefore, the delay is caused more by the gradual fatiguing of the material, than by friction. With materials having a higher coefficient of friction the delay may be caused solely by friction or more by friction than fatiguing and the material selected may be in accordance with the time delay required.

It will, of course, be understood that the amount of time delay is also dependent upon the diameter of the aperture 70 as well as the diameter of the thickest part of the head 69, the taper of said head and the chamfers at each end of the aperture 70.

It should be understood that as the cam plate 36 is turned by turning movement of the indicator lever 16 to indicate the intention of the operator of the vehicle to make either a right or left hand turn, that the cam plate actuates suitable switches to cause blinking of either the right or left hand turn light. The switches and the means for operating the switches may be of any conventional form and form no part of the present invention so are not herein shown or described.

In operation of the turn indicator, the lever 16 may be manually turned by the operator in the proper direction to indicate the intention to make either a right or a left hand turn. This will move the cam plate 36, bracket 50 and plungers 67 about the axis of the shaft 30 in the direction of turning movement of the turn indicator lever 16 and will pass a head 69 of a leading plunger 67 through the aperture of an associated time delay washer 71. The time delay washer 71 will then hold the head and turn indicator in a turn indicating position.

Turning of the cam plate 36 will also pivot the release cam 29 about the axis of the pivot pin 44 and position either one of the actuator ends 26 of the actuator spring 27, depending upon the direction of turning movement of the cam plate 36, in position to be engaged by the release pin 23 on the steering column 11. Engagement of an actuator end of the actuator spring 27 by the release pin 23 will pivot the release cam 29 in a direction to positively pivot the cam plate 36 toward a neutral position. As the actuator end 26 of the actuator spring 27 is engaged by the release pin 23, said pin will also engage the right angled portion 60 of the brake plate 59 and release the brake 25. The turn signal will then be cancelled.

If the steering wheel should not be turned far enough to engage the pin 23 with either of the actuator ends 26 of the actuator spring 27 as when the indicator has been turned to indicate passing or the changing of a lane, and the lane has been changed and the steering wheel has been turned to a straight ahead position, the pin 24 will engage the leg 60 of the brake plate 59 and release the brake 25. The brake 25 being released, the associated compression spring 55 will exert a biasing force on the tongue 53 to withdraw the head 69 from the time delay aperture 70 in a predetermined time delay interval to cancel the turn signal.

While we have herein shown and described one form in which the invention may be embodied, it may readily be understood that various variations and modifications in the invention may be attained without departing from the spirit and scope of the novel concepts thereof.

We claim as our invention:

1. In a directional turn signal,
   a casing open at each end and adapted to be secured to the housing of an automotive steering post and to have a steering post pass therethrough,
   an indicator lever pivotally mounted on said casing and biased into a neutral position and turnable either to the right or left of neutral to indicate a turn,
   means holding said indicator lever in position either to the right or left of neutral including holding means and releasable brake means,
   said holding means comprising a pair of inter-fitting parts having frictionally related portions sized to have interference fit and engageable with one another upon the turning of said indicator lever to indicate a turn,
   tripping means operable by turning movement of said steering wheel when making a turn for releasing said holding means and said brake means as the vehicle is turned to a straight ahead position,
   and other means for releasing said brake means only when the steering wheel is not turned far enough to actuate said tripping means and is turned back to a straight ahead position, to accommodate the return of said indicator lever to a neutral position in a time delay interval determined by the frictional resistance of said interference fit.

2. In a directional turn signal, a casing open at each end and adapted to be secured to the housing of an automotive steering post and to have a steering post pass therethrough, an indicator lever pivotally mounted on said casing and biased into a neutral position and turnable either to the right or left of neutral to initiate a signal and indicate the intention of making either a right or left hand turn, holding means holding said lever in position either to the right or left of neutral including at least one plunger and at least one time delay washer engaged by said plunger and spring means disengaging said plunger from said washer in a predetermined time delay interval, and brake means holding said plunger in engagement with said washer and releasable upon turning of the steering wheel from a turning position back toward a straight ahead position to accommodate the release of said plunger from said washer by the bias of said spring means and the return of said lever to a neutral position in a predetermined time interval determined by the yieldability of said time delay washer.

3. In a directional turn signal, a casing open at each end and adapted to be secured to the housing of an automotive steering post and to have a steering post pass therethrough, an indicator lever pivotally mounted on said casing and biased in a neutral position and turnable either to the right or left of neutral to initiate a signal and indicate the intention of making a turn, means releasably holding said lever in position either to the right or left of neutral including a plunger movable with said lever and a time delay washer engaged by said plunger and spring means disengaging said plunger from said time delay washer in a predetermined time delay interval, brake means holding said plunger in engagement with said time delay washer, tripping means operated by turning movement of the steering wheel for releasing said brake means and positively disengaging said plunger from said washer, and means on said steering post or releasing said brake means only when the degree of turn has not been great enough to actuate said tripping means and the steering post is turned from a turning position back toward a straight ahead position and accommodating the return of said lever to a neutral position in a predetermined time delay by the bias of said spring means.

4. A directional turn indicator in accordance with claim 3, wherein the plunger is made from metal and the time delay washer is made from a synthetic pliable material.

5. In a direction turn indicator, a casing open at each end and adapted to be secured to the housing of an automotive steering post and to have a steering post passed therethrough, an indicator lever pivotally mounted on said casing and biased in a neutral position and turnable either to the right or left of neutral to indicate a turn, yieldable holding means holding said lever in position either to the right or left of neutral including two circumferentially spaced time delay washers spaced to each side of a neutral position of said lever, a pair of oppositely facing plungers movable with said lever, one of said plungers being engageable with one of said washers upon the turning of said lever to indicate the intention of making a turn, spring means exerting forces on said plungers to disengage said plungers from said washers and return said lever to a neutral position, brake means holding a plunger in engagement with an associated washer against the bias of said spring means, tripping means for releasing both said brake means and an associated plunger from its washer and returning said lever to a neutral position, means movable with the steering post engageable with said tripping means and said brake means, upon the completion of a turn of a predetermined radius, and other means movable with said steering post for releasing said brake means only upon the turning of the vehicle an amount insufficient to actuate said tripping means, and releasing said brake means to accommodate the return of said lever into neutral position by the bias of said spring and the gradual fatiguing of the associated washer.

6. A directional turn signal in accordance with the claim 5 wherein the plungers are made from metal and the time delay washers are made from a pliable synthetic material having a relatively low coefficient of friction.

7. In a directional turn indicator, a casing open at each end and adapted to be secured to the housing of an automotive steering post and to have the steering post passed therethrough, a cam plate pivotally mounted within said casing for movement with respect to said steering post about an axis parallel to the axis of turning movement of said steering post, an indicator lever operatively connected to said cam plate and extending therefrom, two oppositely extending plungers supported on said cam plate and extending therefrom, in generally circumferential directions, spring means biasing said plungers, cam plate and lever into a neutral position, two time delay washers, one being spaced circumferentially of each plunger when said indicator lever is in a neutral position and being engaged by an associated plunger upon the turning of said lever either to the right or left of neutral to indicate the intention of making a turn, a tripping cam pivotally mounted on said casing and having slidable connection with said cam plate for positively returning said cam plate and lever to neutral position, brake means holding a plunger in engagement with an associated time delay washer against the bias of said spring means, means on said steering post and movable therewith for positively releasing said brake means and actuating said tripping cam to return said lever to a neutral position, and other means on said steering post and movable therewith for releasing said brake means only when the steering post is not turned a sufficient amount to actuate said tripping cam, and accommodating the return of said cam plate and tripping lever by the bias of said spring means and the gradual fatiguing of an associated washer, when the steering post is turned to a straight ahead position, from a turning position back toward thereby effect the return of the indicator lever to a neutral position in a time delay interval when the steering post is turned toward pass another vehicle and is turned back to a straight ahead position.

8. A directional turn indicator in accordance with claim 7 in which the time delay washers are made from a pliable synthetic material and the plungers are made from metal.

9. In a directional turn indicator, a casing open at each end and adapted to be secured to the housing of an automotive steering post and to have a steering post pass therethrough, a cam plate pivotally mounted within said casing for movement about an axis parallel to the axis of said steering post, an indicator lever operatively connected to said cam plate and extending therefrom, two oppositely extending plungers supported on said cam plate and extending in generally circumferential directions, spring means biasing said plungers, cam plate and indicator lever into a neutral position, two time delay washers, one being spaced circumferentially of each plunger and in circumferential alignment therewith to be engaged by a plunger upon movement of said indicator lever into position to indicate an intention of making a turn, a tripping cam pivotally mounted in said casing and having slidable connection with said cam plate, a member on said steering post movable therewith for positively engaging said tripping cam and moving said tripping cam to release a plunger from an associated washer and return said cam plate and indicator lever to a neutral position upon the making of a turn, brake means holding said cam plate either to the right or left of a neutral position, a member on said steering post engageable with said brake means when the steering post is in position to steer the automotive vehicle in a straight ahead direction, for releasing said brake means and accommodating the return of said cam plate and lever to a neutral position independently of said tripping means, said time delay washers each being made from a synthetic material and said plungers each having a head thereon generally conical in form and curved inwardly at the rear end portion thereof, and said washers offering resistance to the positioning of said cam plate and lever into a neutral position by the bias of said spring means, to delay the return of said lever to a neutral position upon the making of a turn insufficient to actuate said tripping means.

10. A directional turn indicator in accordance with claim 9, in which the synthetic material of said time delay washers is a friction material.

11. A directional turn indicator in accordance with claim 9 in which the synthetic material of said time delay washers is pliable and the delay is caused by the gradual fatiguing of the material.

12. In a directional turn indicator,
a casing adapted to be secured to the housing of a steering post and to have a steering post pass therethrough,
an indicator lever pivotally mounted on and extending radially of said casing and movable either to the right or to the left of a neutral position to indicate the intention of turning,
switch means actuated by turning movement of said indicator lever either to the right or left of a neutral position for energizing a turn indicating signal, indicating the direction of turning, the improvements comprising:
pairs of spaced oppositely disposed first and second telescopically related parts having frictionally related portions engageable with one another and sized to have frictional interference fit upon initiation of an actuating period by turning movement of said indicator lever to indicate a turn,
and biasing means preloaded by engagement of a first and second of said parts to urge said parts apart after engagement and to return said indicator lever to a neutral position,
said parts being made of a material allowing separation thereof under the influence of said biasing means upon the expiration of a predetermined period of time.

13. A directional turn signal as defined by claim 12, in which one of said parts is made of a pliable synthetic material.

References Cited by the Examiner
UNITED STATES PATENTS

| | | | |
|---|---|---|---|
| 2,269,047 | 1/1942 | Woodring | 200—61.27 X |
| 3,114,013 | 12/1963 | Morschel | 200—38 |
| 3,171,912 | 3/1965 | Lambert | 200—61.34 |
| 3,190,981 | 6/1965 | Brown | 200—61.34 |

BERNARD A. GILHEANY, *Primary Examiner.*

H. A. LEWITTER, *Assistant Examiner.*